May 26, 1959 J. C. STASKIEWS ET AL 2,887,812
AUTOMATIC HOOKSETTER
Filed Jan. 31, 1958
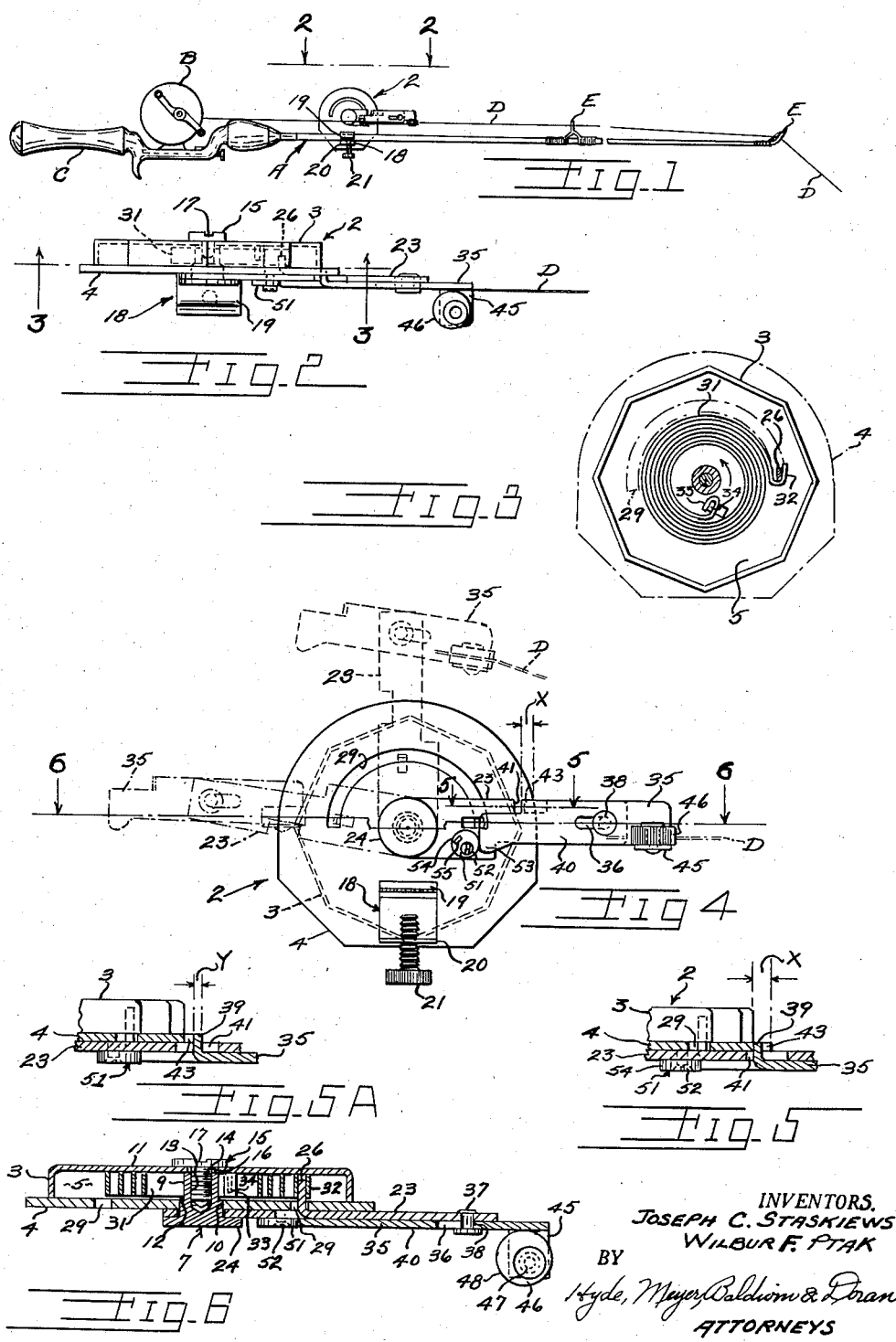
INVENTORS.
JOSEPH C. STASKIEWS
WILBUR F. PTAK
BY
Hyde, Meyer, Baldwin & Doran
ATTORNEYS United States Patent Office 2,887,812
Patented May 26, 1959

2,887,812
AUTOMATIC HOOKSETTER

Joseph C. Staskiews, Elyria, and Wilbur F. Ptak, Parma Heights, Ohio

Application January 31, 1958, Serial No. 712,372

9 Claims. (Cl. 43—15)

This invention relates to fishing devices and more particularly to a hook setting device especially designed for use with fishing apparatus of the type utilizing a fishing line and which is automatically operative, in response to a fish attacking a baited hook or the like attached to said line, to rapidly pull or jerk the latter and thereby set the hook in said fish to effect its capture.

A primary object of the present invention is the provision of a novel and improved hook setting device especially designed for use with fishing apparatus of the type referred to and wherein a fish attacking a baited hook attached to the fishing line is effective to actuate the hook setting device and cause the fish to be impaled on said hook.

Another object of the present invention is the provision of a novel and improved hook setting device especially designed for use with fishing apparatus of the type utilizing a fishing line and wherein the hook setting device is automatically operative in response to a fish attacking a baited hook attached to said line to cause a rapid pull or snap-like movement to the hook sufficient to set the latter in said attacking fish.

Still another object of the present invention is the provision of a novel and improved hook setting device as defined in the preceding objects and wherein the hook setting device is adapted to be attached to the fishing apparatus in operative association with the fishing line, being actuatable by the latter in response to a fish attacking a baited hook attached thereto such as to cause a rapid snap-like movement to said hook sufficiently to cause the impalement of the attaching fish thereon.

Still another object of the present invention is the provision of a novel and improved hook setting device especially designed for use with fishing apparatus of the type referred to and wherein the hook setting device is releasably connected to the fishing line and responsive to a change in the tension of said line caused by a fish attacking a baited hook attached thereto to effect the actuation of said device sufficiently to rapidly pull or jerk said line and cause the impalement of said fish onto the hook.

Another object of the present invention is the provision of a novel and improved hook setting device especially designed for use with fishing apparatus of the type referred to and comprising a spring loaded trigger member engaging the fishing line and responsive to a change in tension of the latter caused by a fish attacking a baited hook attached to said line to rapidly pull or jerk the same sufficiently to impale the said fish on the hook.

Additional objects and advantages of the present invention will be realized by those skilled in the art to which it pertains upon reference to the following description of a preferred embodiment and as illustrated in the accompanying drawings, and wherein:

Fig. 1 is a side elevational view of a conventional rod and reel type of fishing apparatus showing a preferred embodiment of the hook setting device of the present invention mounted on the rod and in operative association with the fishing line;

Fig. 2 is a plan view of the hook setting device of the present invention taken along the line 2—2 of Fig. 1 and shows the operative association between the latter and the fishing line;

Fig. 3 is a side elevational view of the body of the hook setting device of the present invention looking in the direction of the arrows 3—3 of Fig. 2 with the cover plate removed therefrom to show the internal construction;

Fig. 4 is a side elevational view of the hook setting device of the present invention and shows the actuating arm of the device in solid lines in its cocked position, and in broken lines in several of its operative positions during the triggering cycle.

Fig. 5 is a fragmentary sectional view looking substantially in the direction of the arrows 5—5 of Fig. 4 with the actuating arm at its cocked position;

Fig. 5a is a view similar to Fig. 5 but shows the actuating arm moved to a different cocked position; and, Fig. 6 is a sectional view of the hook setting device of the present invention looking substantially in the direction of the arrows 6—6 of Fig. 4.

Referring now to the drawings, the hook setting device of the present invention is herein embodied, merely for purposes of illustration, for use with a conventional fishing apparatus which, in its present form, includes a casting rod A mounting a winding reel B adjacent the hand gripping portion C on its one end, said reel also having wound thereon a quantity of suitable fishing line as is indicated by the reference D. The fishing line D, as is shown in Fig. 1, is unwound from the reel B and passed through the eyelets E, spaced longitudinally along the casting rod A, and then extended beyond the forwardmost eyelet on said rod to receive a suitable fishing hook thereon (not shown). As will be readily understood in the art, a suitable bait or lure is placed upon or near the hook and the latter is then cast or merely lowered into the water wherein it is susceptible to being attacked by a fish or other similar type of marine life. When a fish or the like attacks the baited hook, it ordinarily causes a tensioning of the fishing line D sufficient to indicate to the fisherman that a fish is attacking the bait. He may then rapidly swing the casting rod and pull the line and attached hook and thereby attempt to capture said attacking fish on the latter.

Oftentimes, however, the movements of the attacking fish are so slight and rapid, that before the fisherman is able to react and raise or swing the casting rod, the fish is no longer in position to be caught.

As will be hereinafter apparent, the hook setting device of the present invention is automatically responsive to the movements of the attacking fish, no matter how slight they may be, to attempt to set the hook in the latter, and in its instant form is attached to the casting rod A of the fishing apparatus shown herein and operatively associated with the fishing line D and actuatable by a change in the tension of said line in response to the movements of an attacking fish.

More particularly, the present embodiment of hook setting device comprises a housing 2 formed of a shallow dish shaped body 3 octahedral in configuration, or of other suitable shape, and an irregular-shaped plate 4 placed over the open face of said body to define an enclosed spring chamber 5 therein. The plate 4 and body 3 are adjustably fastened together by means of a bushing 7 having its elongated cylindrical shank 9 extending into and through an aperture 10 formed centrally in the plate 4 and into abutting engagement with the interior surface of the base 11 of the body 3. The bushing is also provided with an enlarged shoulder portion 12 which engages the wall of the plate aperture 10 in press fit relation to retain said bushing in the latter. The shank 9 of said bushing is additionally provided with an internally threaded dead-end hole 13 which threadedly receives the shank 14 of flat-headed screw 15, said shank extending through an aperture 16 formed centrally in the base 11 of the body 3. The enlarged head of the screw 15 is also provided with a slot 17 extending transversely thereacross to accommodate the blade of a screwdriver or the like tool to enable an adjustment to be made in the threaded relationship between said screw and bushing for a purpose to be later explained.

The housing 2 is adapted to be attached to the casting rod A, adjacent and forwardly of the winding reel B, and for this purpose, a clamp 18, substantially C-shaped in configuration is rigidly mounted on the lower central portion of the housing plate 4 as indicated in Figs. 1 and 4, such that the spaced legs 19 and 20 thereof extend substantially perpendicularly outwardly therefrom. The casting rod A is inserted into the clamp 18 between its legs 19 and 20 and is retained therein by means of an elongated screw 21 threadably disposed in the clamp leg 20 and extending upwardly therefrom into engagement with the adjacent surface of the casting rod, being effective to force the latter upwardly into pressure engagement with the leg 19. The clamp leg 19 may also be slightly bowed in its longitudinal dimension so as to provide a maximum seating surface for said casting rod. In this manner, the housing 2 is resiliently secured to the casting rod and may be selectively positioned longitudinally therealong as may be desired by the operator.

The present form of hook setting device is also provided with means operatively connected to the fishing line D, being automatically operative in response to a movement or tensioning of the same as a result of a fish attacking a baited hook secured thereto to effect a rapid pull to said hook in an attempt to capture the attacking fish thereon. For this purpose, an elongated lever or trigger arm 23 has its one end journalled on the enlarged shoulder 12 of the bushing 7, being interposed between the outside face of the housing plate 4 and the enlarged head 24 of said bushing and extending outwardly therefrom substantially parallel to said plate. The trigger arm is likewise integrally provided adjacent its journalled end with a finger or tongue 26, extending substantially perpendicularly thereto and into a semi-circular slot 29 formed in the housing plate 4 and terminating in the spring chamber 5 of the housing 2. A suitable spring element, such as the coil spring indicated at 31 in Figs. 3 and 6, is disposed in the housing spring chamber 5 and has a hook portion 32 on its outermost end embracing the tongue 26 and a similarly shaped but oppositely facing hook portion 33 on its innermost end extending around a detent 34 formed integrally with the base 11 of the housing body 3 and extending substantially perpendicularly upwardly from said base and into the spring chamber 5.

With this construction, it is now seen that by slightly loosening the screw 15 securing the housing body 3 to the plate 4, said body may be rotated in a counterclockwise direction relative to said plate as viewed in Fig. 3, to wind the coil spring in a manner somewhat similar to winding a clock mainspring and thereby place the lever or trigger arm 23 under a predetermined spring pressure.

A pawl lever 35 having an elongated longitudinally extending slot 36 formed therein, adjacent its one end, is movably attached to the free end of the trigger arm 23 by means of a pin 37 rigidly mounted in said latter end of the trigger arm and projecting outwardly therefrom and into and through said slot to define a lost motion connection therebetween permitting said lever to be reciprocably movable relative to said arm. An enlarged head 38 provided on the projected end of said pin, being greater in diameter than the diameter of the slot 36, engages the surface 40 of the lever 35 adjoining either side of said slot to thereby movably secure said members together and also to provide adequate bearing for said lever and hence afford a smooth movement of the latter over the aforementioned surface of the trigger arm 23. The pawl lever 35 is also formed with a pawl or finger 39, being struck from one longitudinal edge, adjacent its one end and extending substantially perpendicularly outwardly therefrom toward the trigger arm 23. Said trigger arm, in turn, is provided with an elongated recess 41 formed in its one longitudinal edge extending therealong, and located in such manner as to receive the aforementioned pawl 39 when the trigger arm 23 and pawl lever 35 are substantially parallel to each other in a position as is indicated in Fig. 4. In addition, the pawl 39 is of such length as to project transversely across and beyond the recess 41 inwardly toward the housing 2 for a purpose now to be explained.

Referring particularly to Figs. 4 and 5, the trigger arm 23 and pawl lever 35 are shown in their cocked position in solid lines, wherein the same are disposed in parallel extension at the right end terminus of the semi-circular slot 29 in the housing plate 4, and under a pre-selected spring pressure, as determined by the wound condition of the coil spring 31. Said members are releasably held in this position by means of a groove 43 formed on the periphery of the housing plate 4 adjacent said letter slot terminus, and extending radially inwardly therefrom toward the axis of the housing 2. With the trigger arm 23 and pawl lever 35 disposed in said parallel relation, and by reason of the slot 36 in said lever, the latter may be slidably moved over the trigger arm toward the housing 2 such that the aforementioned projecting end of the pawl 39 enters into the groove 43. In this manner, therefore, the pawl 39, by being disposed within the groove 43 and also extending transversely across the recess 41 in the trigger arm 23, engages the latter and hence retains the same in the aforesaid cocked or firing position.

With this construction, it is now realized that if a force is subjected to the pawl lever 35 such as to pull it longitudinally along the trigger arm 23 toward the free end of the latter sufficiently to carry the pawl 39 out of the groove 43, said trigger arm will then be free to swing counterclockwise as viewed in Fig. 4 toward the left-hand terminus of the housing slot 29, which shall be hereinafter referred to as the triggered position.

It is contemplated that a tensioning or a longitudinal movement of the fishing line D as a result of a fish attacking a baited hook attached thereto shall provide said pawl displacement force, and to accomplish this, the pawl lever 35 on the end thereof remote to the pawl 39 is integrally provided with a bracket 45 extending transversely thereof in the oposite direction to that of the latter and from the opposed longitudinal edge. A cylindrical lock member 46 is eccentrically rotatably mounted on said bracket by means of a suitable pin 47 in such manner that its peripheral surface 48 is adapted to be rotatably advanced in a clockwise direction, as viewed in Fig. 6, into pressure engagement with the surface 40 of the pawl lever 35. The fishing line D is passed between said pawl lever surface and the lock member 46, and hence by rotating the latter in the aforesaid direction, said fishing line may be securely held therebetween. Thereafter, if an attacking fish causes a tensioning or a longitudinal movement of the fishing line D, of sufficient predetermined magnitude, the force resulting therefrom will be transmitted through said lock member to effect the longitudinal movement of the pawl lever 35 and release the pawl 39 from the groove 43. Said trigger arm and pawl lever will then be free to rapidly swing toward the triggered position in such manner as to subject the fishing line D and attached hook to a rapid pull or jerk effective to snag or capture said attacking fish on the latter.

With this structure, it is now realized that the hook setting device of the present invention is automatically responsive to the movements of an attacking fish to effect its capture, and does not need to rely upon the physical reactions of the fisherman.

Another important feature of the present invention relates to the fact that various kinds and sizes of fish attack a baited hook or the like with different magnitudes of force. For example, one type of fish may attack the bait with slight paring movements while another with a single sudden thrust of substantially more ferocity. Hence in order that the device of the present invention may be responsive to the attacking movements characteristic of many varieties of fish, adjustment means are provided to selectively position the pawl 39 of the pawl lever 35 within the groove 43 so that various magnitudes of forces may be effective to release the pawl 39 from said groove, and hence actuate the trigger arm 23. Said adjustment means comprises a circular cam 51 eccentrically rotatably mounted on the trigger arm 23 by means of a suitable threaded fastener 52 in juxtaposition to the inner end of the pawl lever 35. Said latter end of the pawl lever is, in addition, integrally formed with a depending shoulder 53 located in such manner to engage the surface 54 of the cam 51 when said pawl lever and trigger arm 23 are disposed in the aforesaid cocked or firing position. The cam 51 is further provided with a slot 55 adapted to accommodate a tool, or the like (not shown) by which the same may be rotated to advance and/or retract its surface 54 relative to the pawl lever shoulder 53. For example, as is shown in Figs. 4 and 5, the cam 51 is positioned so that the pawl lever 35 may be slidably moved longitudinally along the trigger arm 23 inwardly toward the housing 2 whereby the pawl 39 on said lever is disposed a maximum distance within the groove 43 before it engages the cam surface 54; said distance being indicated by the reference character "X." With the pawl 39 thus positioned it is then realized that a force must be applied to the fishing line D of sufficient magnitude to pull the pawl lever 35 outwardly along the trigger arm 23 a distance "X" to release said pawl from the groove 43 before said trigger arm will be free to swing under the influence of the spring 31 to its triggered position. Likewise, with reference to Fig. 5a, the cam 51 is shown to be rotated to position the pawl 39 within the groove 43 a distance as denoted by the reference character "Y." Hence, a force effective to move the pawl lever 35 a distance "Y" must be applied to the fishing line D by an attacking fish before the trigger arm 23 will be actuated to cause a rapid pull or jerk to the baited hook.

Having thus described a preferred form of the hook setting device of the present invention, its operation, when utilized with the form of fishing apparatus disclosed herein will now be summarized.

With the hook setting device attached to the casting rod A in the manner previously described, and a suitable bait or lure supplied to the hook attached to the fishing line D, it is then lowered or cast into the water. The trigger arm 23 and said pawl lever are then moved against the pressure of the coil spring 31 to the right hand terminus of the slot 29, in a parallel relationship as viewed in Fig. 4. The pawl lever is then slidably moved longitudinally along said trigger arm inwardly toward the housing 2 to position the pawl 39 within the groove 43; said position being selectively determined by the placement of the cam 51. The fishing line D is passed between the surface 40 of the pawl lever, and the lock member 46, and the latter is then rotated clockwise as viewed in Fig. 6 to advance its surface 48 toward the pawl lever surface 40 such as to bind the fishing line D therebetween. The hook setting device is therefore disposed in a cocked condition awaiting a marauding fish or the like. Thereafter, if said fish attacks the baited hook with sufficient force to move the pawl lever 35 and dislodge the pawl 39, the trigger arm 23 and said pawl lever will then rapidly swing from said cocked position under the influence of spring 31, as is indicated in solid lines in Fig. 4 to its fully triggered position at the left end terminus of the slot 29, such as is indicated in dot-dash lines, wherein it is seen that said trigger lever has rotated approximately 180 degrees to extend outwardly from the opposite side of the housing while the pawl lever 35 faces in substantially the same direction but is spaced rearwardly relative to the casting rod A, a distance approximately equal to or great than the diameter of the housing 2. Said pawl lever is also shown to engage the pin 37 at the opposite end of the slot 36. As a result the fishing line D is rapidly pulled or jerked rearwardly with the pawl lever such as to snag or impale said attacking fish thereon. The lock member may then be rotated counter clockwise, as seen in Fig. 6, to release the fishing line L and the winding reel B actuated in the well known manner to reel in the captured fish.

It is now realized that the hook setting device of the present invention is automatically responsive to the movements of an attacking fish to effect its capture and does not need to rely upon the physical reactions of the fisherman. It is also realized that the hook setting device is selectively adjustable to effect the capture of many varieties of fish having different attacking characteristic which result in different magnitudes of force being subjected to the fishing apparatus.

It is further realized that the several components of the hook setting device may be altered to operate in a different manner to produce the same results. For example, the trigger arm 23 may be attached to the housing 2 so as to be actuatable in a reciprocatory manner to effect the rapid movement to the fishing line and attached hook.

Having thus described a preferred embodiment of the hook setting device of the present invention, it is realized that the same is susceptible to various modifications and arrangements and combinations of parts without departing from the inventive concepts as recited in the following claims.

What is claimed is:

1. A fishing device for use with fishing apparatus including a casting rod and a fishing line having a hook-type lure attached thereto, comprising a housing attached to said casting rod, an arm swingably mounted on said housing, lever means operatively engageable with said fishing line and movably attached to said arm, means in said housing for releasably holding said arm and lever means in a cocked position, means on said arm extending into said housing, spring means disposed in said housing engaging said last named means and operable to condition said arm under a predetermined spring pressure in said latter position, said lever means being responsive to a tensioning of the fishing line caused by the movements of a fish attacking the lure to release said arm and allow the latter and said lever means to rapidly swing about said housing under the influence of said spring means and pull the fishing line and lure sufficiently to capture the fish thereon.

2. A fishing device for use with fishing apparatus including a casting rod and a fishing line having a hook-type lure attached thereto, comprising a housing attached to said casting rod, an arm swingably mounted on said housing, a curved slot formed in said housing, means on said arm extending through said curved slot and into said housing, a lever operatively engageable with said fishing line and movably attached to said arm, means in said housing for releasably holding said arm and lever in a cocked position adjacent one end of said slot, spring means disposed in said housing engaging the means extending through said curved slot and operable to condition said arm under a predetermined spring pressure in said latter position, said lever being responsive to a tensioning of the fishing line caused by the movements of a fish attacking the lure to release said arm and allow the latter and said lever to rapidly swing throughout the length of said curved slot and pull the fishing line and lure to capture the fish thereon.

3. A fishing device for use with fishing apparatus including a casting rod and a fishing line having a hook-type lure attached thereto, comprising a housing attached to said casting rod, an arm swingably mounted on said housing and movable in a plane substantially parallel to the latter, a curved slot formed in said housing, tongue means formed integrally on said arm extending through said slot and into said housing, a lever operatively engageable with said fishing line and mounted to one end of said arm to define a lost motion connection therebetween, means in said housing for releasably holding said arm and lever in a cocked position at one terminus of said curved slot, spring means in said housing engaging said tongue means to condition said arm under a predetermined spring pressure at said latter position, said lever being responsive to a tensioning of the fishing line caused by a fish attacking the lure to move longitudinally of said arm and release the same whereby said arm and lever rapidly swing in said plane throughout the length of said curved slot and pull the fishing line and lure to capture the fish thereon.

4. A fishing device for use with fishing apparatus including a casting rod and a fishing line having a hook-type lure attached thereto, comprising a housing attached to said casting rod, an arm swingably mounted on said housing and movable in a plane substantially parallel to the latter, a curved slot formed in said housing, tongue means formed integrally on said arm extending through said slot and into said housing, a lever operatively engageable with said fishing line and mounted to one end of said arm to define a lost motion connection therebetween, groove means formed in said housing, a longitudinally extending recess formed in said arm, pawl means provided on said lever extending transversely through said recess and into said groove means to releasably hold said arm and lever in a cocked position at one terminus of said curved slot, spring means in said housing engaging said tongue means to condition said arm under a predetermined spring pressure at said latter position, said lever being responsive to a tensioning of the fishing line caused by a fish attacking the lure to release said pawl from said groove means whereby said arm and lever rapidly swing throughout the length of said curved slot and pull the fishing line and lure to capture the fish thereon.

5. A fishing device for use with fishing apparatus including a casting rod and a fishing line having a hook-type lure attached thereto, comprising a housing attached to said casting rod, an arm swingably mounted on said housing and movable in a plane substantially parallel to the latter, a curved slot formed in said housing, tongue means formed integrally on said arm extending through said slot and into said housing, a lever mounted on one end of said arm to define a lost motion connection therebetween, lock means on said lever for releasably securing a fishing line in substantial longitudinal extension thereto, means in said housing for releasably holding said arm and lever in a forwardly extending cocked position relative to said housing at one terminus of said curved slot, spring means in said housing engaging said tongue means to condition said arm under a predetermined spring pressure at said latter position, said lever being responsive to a tensioning of the fishing line caused by a fish attacking the lure to move longitudinally of said arm to release and allow the latter and said lever to rapidly swing throughout the length of said curved slot to a rearward triggered position relative to said housing to pull the fishing line and lure to capture the fish thereon.

6. A fishing device as defined in claim 5 and wherein the lock means comprises a cylindrical member eccentrically rotatably mounted on the lever and effective to releasably bind the fishing line therebetween.

7. A fishing device for use with fishing apparatus including a casting rod and a fishing line having a hook-type lure attached thereto, comprising a housing attached to said casting rod, an arm swingably mounted on said housing and movable in a plane substantially parallel to the latter, a curved slot formed in said housing, tongue means formed integrally on said arm extending through said slot and into said housing, a lever operatively engageable with said fishing line and mounted to one end of said arm to define a lost motion connection therebetween, groove means formed in said housing, a longitudinally extending recess formed in said arm, pawl means provided on said lever extending transversely through said recess and into said groove means to releasably hold said arm and lever in a cocked position at one terminus of said curved slot, means on said arm for selectively positioning the lever pawl means within the groove means on said arm, spring means in said housing engaging said tongue means to condition said arm under a predetermined spring pressure at said latter position, said lever being responsive to a tensioning of the fishing line caused by a fish attacking the lure to release said pawl from said groove means whereby said arm and lever rapidly swing throughout the length of said curved slot and pull the fishing line and lure to capture the fish thereon.

8. A fishing device for use with fishing apparatus including a casting rod and a fishing line having a hook-type lure attached thereto, comprising a housing attached to said casting rod, an arm swingably mounted on said housing, lever means operatively engageable with said fishing line and movably attached to said arm, means in said housing for releasably holding said arm and lever means in a cocked position, means on said arm for selectively adjusting the lever means relative to said arm in said firing position, spring means for conditioning said arm under a predetermined spring pressure in said position, said lever means being responsive to a tensioning of the fishing line caused by a fish attacking the lure to release said arm and allow the latter and said lever means to rapidly swing about said housing under the influence of said spring means and pull the fishing line and lure sufficiently to capture the fish thereon.

9. A fishing device as defined in claim 7 and wherein the selective positioning means on said arm comprises a circular cam eccentrically rotatably mounted on the latter and movable into engagement with the lever to move the latter longitudinally along said arm.

References Cited in the file of this patent

UNITED STATES PATENTS

| | | |
|---|---|---|
| 916,891 | Schildbach | Mar. 30, 1909 |
| 2,194,088 | Jabson | Mar. 19, 1940 |
| 2,303,668 | Tilbury | Dec. 1, 1942 |
| 2,461,356 | Sus et al. | Feb. 8, 1949 |
| 2,482,999 | Bean | Sept. 27, 1949 |
| 2,590,721 | Muth | Mar. 25, 1952 |